United States Patent
Yap (10) Patent No.: US 7,499,653 B2
(45) Date of Patent: Mar. 3, 2009

(54) MULTIPLE WAVELENGTH PHOTONIC OSCILLATOR

(75) Inventor: Daniel Yap, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 678 days.

(21) Appl. No.: 10/786,721

(22) Filed: Feb. 24, 2004

(65) Prior Publication Data

US 2005/0013612 A1     Jan. 20, 2005

Related U.S. Application Data

(60) Provisional application No. 60/487,534, filed on Jul. 14, 2003.

(51) Int. Cl.
*H01S 3/098* (2006.01)
*G02F 1/03* (2006.01)

(52) U.S. Cl. .................. 398/115; 398/116; 398/117

(58) Field of Classification Search ......... 398/203–206, 398/115–117
See application file for complete search history.

(56) References Cited

U.S. PATENT DOCUMENTS

| | | | |
|---|---|---|---|
| 4,028,702 A | 6/1977 | Levine | 343/100 SA |
| 4,296,319 A | 10/1981 | Franks et al. | 250/227 |
| 4,601,027 A * | 7/1986 | Scarr et al. | 398/79 |
| 5,001,336 A | 3/1991 | De La Chapelle | 250/208.2 |
| 5,153,762 A | 10/1992 | Huber | 359/125 |
| 5,379,309 A | 1/1995 | Logan, Jr. | 372/18 |
| 5,383,198 A | 1/1995 | Pelouch et al. | 372/18 |
| 5,404,006 A | 4/1995 | Schaffner et al. | 250/208.2 |
| 5,428,814 A | 6/1995 | Mort et al. | 455/12.1 |
| 5,450,223 A * | 9/1995 | Wagner et al. | 398/121 |
| 5,504,774 A | 4/1996 | Takai et al. | 375/134 |
| 5,548,434 A * | 8/1996 | Shimonaka et al. | 398/162 |

(Continued)

FOREIGN PATENT DOCUMENTS

EP       0 352 747 A2       1/1990

(Continued)

OTHER PUBLICATIONS

Mitra, "Digital Signal Processing", p. 788-789, copyrighted 2002.*

(Continued)

*Primary Examiner*—Kenneth N Vanderpuye
*Assistant Examiner*—Danny W Leung
(74) *Attorney, Agent, or Firm*—Ladas & Parry (57) ABSTRACT

A multi-wavelength photonic oscillator has a plurality of lasers each emitting light at a different frequency. An optical wavelength multiplexer combines the light emitted by the plurality of lasers at an output thereof as a set of optical wavelengths. An optical modulator is arranged in a feedback loop and coupled to receive light at the output of the optical wavelength multiplexer, the feedback loop further including an optical tap for coupling at least a subset of said set of optical wavelengths to at least one optical output of the multi-wavelength photonic modulator; at least one optical channel having an associated photodetector arranged to receive light from the optical tap via the at least one optical channel; and an electronic loop portion coupled to receive output from the at least one associated photodetector and to provide an input for the optical modulator.

38 Claims, 6 Drawing Sheets

U.S. PATENT DOCUMENTS

| | | | |
|---|---|---|---|
| 5,577,057 A | 11/1996 | Frisken | 372/18 |
| 5,617,239 A | 4/1997 | Walker | 359/181 |
| 5,625,729 A | 4/1997 | Brown | 385/31 |
| 5,687,261 A | 11/1997 | Logan | 385/24 |
| 5,710,651 A | 1/1998 | Logan, Jr. | 359/145 |
| 5,723,856 A | 3/1998 | Yao et al. | 250/227.1 |
| 5,777,778 A | 7/1998 | Yao | 359/245 |
| 5,796,506 A | 8/1998 | Tsai | 359/191 |
| 5,859,611 A | 1/1999 | Lam et al. | 342/368 |
| 5,861,845 A | 1/1999 | Lee et al. | 342/375 |
| 5,917,179 A | 6/1999 | Yao | 250/227.1 |
| 5,917,970 A | 6/1999 | Burns et al. | 385/24 |
| 5,929,430 A * | 7/1999 | Yao et al. | 250/227 |
| 5,930,031 A | 7/1999 | Zhou et al. | 359/344 |
| 5,933,113 A | 8/1999 | Newburg et al. | 342/375 |
| 5,999,128 A | 12/1999 | Stephens et al. | 342/375 |
| 6,027,254 A | 2/2000 | Yamada et al. | 385/88 |
| 6,061,369 A | 5/2000 | Conradi | 372/6 |
| 6,178,036 B1 | 1/2001 | Yao | 359/334 |
| 6,188,808 B1 | 2/2001 | Zhou et al. | 385/3 |
| 6,195,187 B1 | 2/2001 | Soref et al. | 398/9 |
| 6,201,638 B1 | 3/2001 | Hall et al. | 359/346 |
| 6,215,592 B1 | 4/2001 | Pelekhaty | 359/260 |
| 6,262,681 B1 | 7/2001 | Persechini | 342/188 |
| 6,341,025 B1 * | 1/2002 | Mizrahi et al. | 398/87 |
| 6,348,890 B1 | 2/2002 | Stephens | 342/375 |
| 6,388,787 B1 | 5/2002 | Bischoff | 359/187 |
| 6,452,546 B1 | 9/2002 | Stephens | 342/368 |
| 6,556,322 B1 * | 4/2003 | Desurvire | 398/98 |
| 6,580,532 B1 | 6/2003 | Yao et al. | 359/111 |
| 6,591,026 B2 | 7/2003 | Endo et al. | 385/15 |
| 6,643,299 B1 | 11/2003 | Lin | 372/6 |
| 6,661,974 B1 * | 12/2003 | Akiyama et al. | 398/95 |
| 6,724,523 B2 | 4/2004 | Yap | 359/333 |
| 6,724,783 B2 | 4/2004 | Jalali et al. | 372/9 |
| 6,731,829 B2 | 5/2004 | Ionov | 385/15 |
| 6,852,556 B2 | 2/2005 | Yap | 438/22 |
| 6,867,904 B2 | 3/2005 | Ng et al. | 359/332 |
| 6,872,985 B2 | 3/2005 | Yap | 257/82 |
| 6,940,878 B2 | 9/2005 | Orenstein et al. | 372/20 |
| 7,050,723 B2 * | 5/2006 | Katagiri et al. | 398/195 |
| 7,079,772 B2 * | 7/2006 | Graves et al. | 398/95 |
| 7,085,499 B2 | 8/2006 | Yap et al. | 398/123 |
| 2001/0038313 A1 | 11/2001 | Johnson et al. | 331/135 |
| 2002/0021464 A1 | 2/2002 | Way | 359/124 |
| 2002/0122615 A1 | 9/2002 | Painter et al. | 385/15 |
| 2003/0003961 A1 | 1/2003 | Li et al. | 455/562 |
| 2003/0080898 A1 | 5/2003 | Wang et al. | 342/359 |
| 2003/0089843 A1 | 5/2003 | Sayyah et al. | 250/227.21 |
| 2003/0090767 A1 | 5/2003 | Yap et al. | 359/181 |
| 2003/0091097 A1 | 5/2003 | Yap et al. | 375/132 |
| 2003/0197917 A1 | 10/2003 | Yap et al. | 359/330 |
| 2003/0227629 A1 | 12/2003 | Dobbs et al. | 356/437 |
| 2004/0120638 A1 | 6/2004 | Frick | 385/27 |
| 2004/0264977 A1 | 12/2004 | Yap et al. | 398/161 |
| 2005/0013612 A1 | 1/2005 | Yap | 398/53 |

FOREIGN PATENT DOCUMENTS

| | | |
|---|---|---|
| JP | 07-26136 | 7/1995 |
| JP | 07-264136 | 10/1995 |
| WO | 99/66613 | 12/1999 |
| WO | 00/44074 | 7/2000 |
| WO | 00/45213 A1 | 8/2000 |
| WO | 01/29992 A1 | 4/2001 |
| WO | 01/80507 A2 | 10/2001 |
| WO | 02/099939 A1 | 12/2002 |
| WO | 03/042734 A1 | 5/2003 |
| WO | 03/043126 A1 | 5/2003 |
| WO | 03/043147 A1 | 5/2003 |
| WO | 03/043177 A2 | 5/2003 |
| WO | 03/043178 A2 | 5/2003 |
| WO | 03/043195 A1 | 5/2003 |
| WO | 03/043231 A2 | 5/2003 |

OTHER PUBLICATIONS

U.S. Appl. No. 10/696,607, filed Oct. 28, 2003, Yap.
U.S. Appl. No. 10/766,103, filed Jan. 24, 2004, Ng et al.
Abstract of JP 07-264136, Patent Abstracts of Japan, vol. 1996, No. 2 (Feb. 1996).
Chang, K., Handbook of Microwave and Optical Components, *John Wiley and Sons*, pp. 595-626, 670-674 (1989).
Narayan, A., et al., "High-Efficiency Waveguide Coupled=1.3 μm $In_xGa_{1-x}As/GaAs$ MSM Detector Exhibiting Large Extinction Ratios at L and X Band," IEEE Photonic Technology Letters, vol. 5, pp. 514-517 (1993).
Oda, K., et al., "A Wide-FSR Waveguide Double-Ring Resonator for Optical FDM Transmission Systems," *Journal of Lightwave Technology*, vol. 9, No. 6, pp. 728-736 (Jun. 1991).
Zmuda, H., et al., "Photonic Beamformer for Phased Array Antennas Using a Fiber Grating Prism," *IEEE Photonics Technology Letters*, vol. 9, No. 2 pp. 241-243 (Feb. 1997).
Bilodeau, F., et al., "An All-Fiber Dense-Wavelength-Division Multiplexer/Demultiplexer Using Photoimprinted Bragg Gratings," *IEEE Photonics Technology Letters*, vol. 7, No. 4, pp. 388-390 (Apr. 1995).
Madsen, C.K., et al., "Planar Waveguide Optical Spectrum Analyzer Using a UV-Induced Grating," *IEEE Journal of Selected Topics in Quantum Electronics*, vol. 4, No. 6, pp. 925-929 (Nov./Dec. 1998).
Tishinin, D.V., et al., "Vertical Resonant Couplers with Precise Coupling Efficiency Control Fabricated by Wafer Bonding," *IEEE Photonics Technology Letters*, vol. 11, No. 8, pp. 1003-1005 (Aug. 1999).
Selected Definitions from Wikipedia at http://en.wikipedia.org accessed Jul. 27, 2006.
Logan Jr., R., et al., "All-Optical Heterodyne RF Signal Generation Using a Mode-locked-laser Frequency Comb: Theory and Experiments", *Microwave Symposium Digest*, 200 IEEE MTT-S Internal vol. 3, pp. 1741-1744 (Jun. 2000).
Gliese, U, et al., "A wideband heterodyne optical phase-locked loop for generation of 3-18 GHZ microwave carries", *IEEE Photonics Technology Letters*, vol. 4, pp. 936-938 (Aug. 1992).
Agrawal, G.P., *Nonlinear Fiber Optics*, Academic Press, Chapter 9, pp. 370-398 (1995).
Alexe, M., et al., "Low Temperature GaAs/Si Direct Wafer Bonding," *Electronics Letters*, vol. 36, No. 7 (Mar. 30, 2000).
Bennett, S., et al., "1.8-THz Bandwidth, Zero-Frequency Error, Tunable Optical Comb Generator for DWDM Applications," *IEEE Photonics Technology Letters*, vol. 11, No. 5, pp. 551-553 (May 1999).
Berger, J.D., et al., "Widely Tunable External Cavity Diode Lase Base On A MEMS Electrostatic Rotary Actuator," *Paper TuJ2-1*, OFC, Anaheim, California, pp. TuJ2-1-TuJ2-3 (2001).
Bilodeau, F., et al., "An All-Fiber Dense-Wavelength-Division Multiplexer/Demultiplexer Using Photoimprinted Bragg Gratings," *IEEE Photonics Technology Letters*, vol. 7, No. 4, pp. 388-390 (Apr. 1995).
Bordonalli, A.C., et al., "High-Performance Phase Locking of Wide Linewidth Semiconductor Lasers by Combined Use of Optical Injection Locking and Optical Phase-Lock Loop," *Journal of Lightwave Technology*, vol. 17, No. 2, pp. 328-342 (Feb. 1999).
Chan, W.K., et al., "Grafted Semiconductor Optoelectronics," *IEEE Journal Of Quantum Electronics*, vol. 27, No. 3, pp. 717-725 (Mar. 1991).
Chu, S.T, et al., "An Eight-Channel Add-Drop Filter Using Vertically Coupled Microring Resonators over a Cross Grid," *IEEE Journal of Technology Letters*, vol. 11, No. 6, pp. 691-693 (Jun. 1999).
Chu, S.T., et al., "Wavelength Trimming of a Microring Resonator Filter by Means of a UV Sensitive Polymer Overlay," *IEEE Photonics Technology Letters*, vol. 11, No. 6, pp. 688-690 (Jun. 1999).
Collins, J.V., et al., "Passive Alignment of Second Generation Optoelectronic Devices," *IEEE Journal of Selected Topics In Quantum Electronics*, vol. 3, No. 6, pp. 1441-1444 (Dec. 1997).

Corbett, B., et al., "Low-Threshold Lasing in Novel Microdisk Geometries," *IEEE Photonics Technology Letters*, vol. 8, No. 7, pp. 855-857 (Jul. 1996).

Corbett, B., "Spectral Characteristics of Low Threshold Microdisks," *IEEE Lasers and Electro-Optics Society 1996 Annual Meeting*, vol. 2, pp. 197-198 (1996).

Deckman, B., et al., "A 5-Watt, 37-GHz Monolithic Grid Amplifier," *IEEE MTT-S Digest*, pp. 805-808 (2000).

Escalera, N., et al., "Ka-Band, 30 Watts Solid State Power Amplifier," *IEEE MTT-S Digest*, paper TU1F-42, pp. 561-563 (2000).

Fukushima, S., et al., "Direct Opto-Electronic Sythesis of mW-Level Millimeter-Wave Signals Using An Optical Frequency Comb Generator and a Uni-Traveling-Carrier Photodiode," *IEEE MTT-S Digest*, pp. 69-72 (2001).

Ghirardi, F., et al., "Monolithic Integration of an InP Based Polarization Diversity Heterodyne Photoreceiver with Electrooptic Adjustability," *Journal of Lightwave Technology*, vol. 13, No. 7, pp. 1536-1549 (Jul. 1995).

Goldsmith, C.L., et al., "Principles and Performance of Traveling-Wave Photodetector Arrays," *IEEE Transactions on Microwave Theory and Techniques*, vol. 45, No. 8, pp. 1342-1350 (Aug. 1997).

Hansen, D.M., et al., "Development Of A Glass-Bonded Complaint Substrate," *Journal of Crystal Growth*, vol. 195, pp. 144-150 (1998).

Haus, H., et al., "Narrow-Band Optical Channel-Dropping Filter," *Journal of Lightwave Technology*, vol. 10, No. 1, pp. 57-61 (Jan. 1992).

Ibsen, M., et al., "30dB Sampled Gratings In Germanosilicate Planar Waveguides," *Electronics Letters*, vol. 32, No. 24, pp. 2233-2235 (Nov. 21, 1996).

Ih, C.S., et al., "Dense All Optical WDM-SCM Technology for High Speed Computer Interconnects," *Optoelectronic Interconnects*, SPIE, vol. 1849, pp. 308-318 (1993).

Ingram, D.L., et al., "Compact W-Band Solid-State MMIC High Power Sources," *IEEE MTT-S Digest*, pp. 955-958 (2000).

Jayaraman, V., et al., "Extended Tuning Range in Sampled Grating DBR Lasers," *IEEE Photonics Technology Letters*, vol. 5, No. 5, pp. 489-491 (May 1993).

Johansson, L.A., et al., "Millimeter-Wave Modulated Optical Signal Generation with High Spectral Purity and Wide-Locking Bandwidth Using a Fiber-Integrated Optical Injection Phase-Lock Loop," *IEEE Photonics Technology Letters*, vol. 12, No. 6, pp. 690-692 (Jun. 2000).

Kato, K., et al., "PLC Hybrid Integration Technology And Its Application To Photonic Components," *IEEE Journal of Selected Topics in Quantum Electronics*, vol. 6, No. 1, pp. 4-13 (2000).

Kato, K., "Ultrawide-Band/High-Frequency Photodetectors," *IEEE Transactions on Microwave Theory and Techniques*, vol. 47, No. 7, pp. 1265-1281 (Jul. 1999).

Kazarinov, R., et al., "Narrow-Band Resonant Optical Reflectors and Resonant Optical Transformers for Laser Stabilization and Wavelength Division Multiplexing," *IEEE Journal of Quantum Electronics*, vol. QE-23, No. 9, pp. 1419-1425 (Sep. 1987).

Kazovsky, L.G., et al., "A 1320-nm Experimental Optical Phase-Locked Loop: Performance Investigation and PSK Homodyne Experiments at 140 Mb/s and 2 Gb/s," *Journal of Lightwave Technology*, vol. 8, No. 9, pp. 1414-1425 (Sep. 1990).

Kikuchi, K., et al., "Amplitude-Modulation Sideband Injection Locking Characteristics of Semiconductor Lasers and their Application," *Journal of Lightwave Technology*, vol. 6, No. 12, pp. 1821-1830 (Dec. 1988).

Kitayama, K., "Highly-Stabilized, Tunable Millimeter-Wave Generation by Using Fiber-Optic Frequency Comb Generator," *Microwave Photonics*, pp. 13-16 (Dec. 3, 1996).

Kobayashi, Y., et al., "Optical FM signal Amplification and FM Noise Reduction in an Injection Locked AlGaAs Semiconductor Laser," *Electronics Letters*, vol. 17, No. 22, pp. 849-851 (Oct. 29, 1981).

Lee, C.C., et al., "Measurement of Stimulated-Brillouin-Scattering Threshold for Various Types of Fibers Using Brillouin Optical-Time-Domain Reflectometer," *IEEE Photonics Letters*, vol. 12, No. 6, pp. 672-674 (Jun. 2000).

Little, B.E., et al., "Ultra-Compact $Si—SiO_2$ Microring Resonator Optical Channel Dropping Filters," *IEEE Photonics Technology Letters*, vol. 10, No. 4, pp. 549-551 (Apr. 1998).

Little, B.E., "Vertically Coupled Glass Microring Resonator Channel Dropping Filters," *IEEE Photonics Technology Letters*, vol. 11, No. 2, (Feb. 1999).

Little, B.E., et al., "Wavelength Switching and Routing Using Absorption and Resonance," *IEEE Photonics Technology Letters*, vol. 10, No. 6, pp. 816-818 (Jun. 1998).

Liu, T., et al., "InP-Based DHBT with 90% Power-Added Efficiency and 1 W Output Power at 2 GHZ," *Solid-State Electronics*, vol. 41, No. 10, pp. 1681-1686 (1997).

London, J.M., "Preparation of Silicon-on-Gallium Arsenide Wafers for Monolithic Optoelectronic Integration," *IEEE Photonics Technology Letters*, vol. 11, No. 8, pp. 958-960 (1999).

MacDonald, R.I., et al., "Hybrid Optoelectronic Integrated Circuit," *Applied Optics*, vol. 26, No. 5, pp. 842-844 (Mar. 1, 1987).

Murthy, S., et al., "A Novel Monolithic Distributed Traveling-Wave Photodetector with Parallel Optical Feed," *IEEE Photonics Technology Letters*, vol. 12, No. 6, pp. 681-683 (Jun. 2000).

Ng., W., et al., "High-Efficiency Waveguide-Coupled $\lambda=1.3$ µm $In_xGa_{1-x}As$/GaAs MSM Detector Exhibiting Large Extinction Ratios at $L$ and $X$ Band", *IEEE Photonics Technology Letters*, vol. 5, No. 5, pp. 514-517 (1993).

Ng, W., et al., "High-Speed Single-and Multi-Element Fiber-Grating Coupled Diode Laser Transmitters for WDM Networks," *IEEE*, pp. 362-363 (1998).

*Radio Frequency Photonic Synthesizer*, United Telecommunications Products, Inc., Chalfont, PA, Transmission Systems Division, (Jan. 2000).

Ramos, R.T., et al., "Optical Injection Locking and Phase-Lock Loop Combined Systems," *Optics Letters*, vol. 19, No. 1, pp. 4-6 (Jan. 1, 1994).

Sakamoto, S.R., et al., "Substrate Removed GaAs-AlGaAs Electrooptic Modulators", *IEEE Photonics Technology Letters*, vol. 11, No. 10, pp. 1244-1246 (1999).

Sarlet, G., et al., "Wavelength and Mode Stabilization of Widely Tunable SG-DBR and SSG-DBR Lasers," *IEEE Photonics Technology Letters*, vol. 11, No. 11, pp. 1351-1353 (Nov. 1999).

Sayyah, K., et al., "Multi-Tone Photonic Oscillator," *Proceedings of the SPIE*, vol. 4490, pp. 52-62 (2001).

Schäffer, C.G., "Application of Optical Amplifiers in a Microwave Distribution Network for Phased Array Antennas," *Lasers and Electro-Optics Society Annual Meeting*, 1995, *8th Annual Meeting Conference Proceedings*, vol. 1, pp. 202-203 (Oct. 30-31, 1995).

Shimizu, N., et al., "InP-InGaAs Uni-Traveling-Carrier Photodiode With Improved 3-dB Bandwidth of Over 150 GHz," *IEEE Photonics Technology Letters*, vol. 10, No. 3, pp. 412-414 (Mar. 1998).

Tishinin, D.V., et al., "Vertical Resonant Couplers with Precise Coupling Efficiency Control Fabricated by Wafer Bonding", *IEEE Photonics Technology Letters*, vol. 11, No. 8, pp. 1003-1005 (1999).

Tsao, S.-L, "Phaselocked Tunable Subcarrier Comb Generator," *Electronics Letters*, vol. 30, No. 24, pp. 2059-2060 (Nov. 24, 1994).

Yamamoto, T., et al., "270-360 Ghz Tunable Beat Signal Light Generator For Photonic Local Oscillator," *Electronics Letters*, vol. 38, No. 15, pp. 795-797 (Jul. 2002).

Yanagisawa, M., et al., "Film-Level Hybrid Integration of AlGaAs Laser Diode with Glass Waveguide on Si Substrate," *IEEE Photonics Technology Letters*, vol. 4, No. 1, pp. 21-23 (Jan. 1992).

Yao, X.S., et al., "High Frequency Optical Subcarrier Generator," *Electronics Letters*, vol. 30, No. 18, pp. 1525-1526 (Sep. 1, 1994).

Yao, X.S., "High-Quality Microwave Signal Generation by Use of Brillouin Scattering in Optical Fibers," *Optics Letters*, vol. 22, No. 17, pp. 1329-1331 (Sep. 1, 1997).

Yao, X.S., "Multiloop Optoelectronic Oscillator," *IEEE Journal of Quantum Electronics*, vol. 36, No. 1, pp. 79-84 (Jan. 2000).

Yao, X.S., et al., "Optoelectronic Microwave Oscillator," *J. Opt. Soc. Am. B*, vol. 13, No. 8, pp. 1725-1735 (Aug. 1996).

Yao, X.S., et al., "Optoelectronic Oscillator for Photonic Systems," *IEEE Journal of Quantum Electronics*, vol. 32, No. 7, pp. 1141-1149 (Jul. 1996).

Yap, D., et al., "Agile Waveform Generation & Frequency Conversion," *RF-Lightwave Integrated Circuits Program Kickoff Meeting*, pp. DY1-DY10 (Aug. 16, 2000).

Yap, D., et al., "Switched Photonic Link for Distribution of Local-Oscillator Signals," *IEEE Photonics Technology Letters*, vol. 12, No. 11, pp. 1552-1554 (Nov. 2000).

Yi-Yan, A., et al., "GaInAs/InP *pin* Photodetectors Integrated with Glass Waveguides," *Electronics Letters*, vol. 27, No. 1, pp. 87-89 (Jan. 3, 1991).

Yi-Yan, A., et al., "Semiconductor-Film Grafting: A New Approach to OEICs," *Circuits & Devices*, pp. 26-30 (May 1992).

* cited by examiner

MULTIPLE WAVELENGTH PHOTONIC OSCILLATOR

CROSS REFERENCE TO RELATED APPLICATION

This application claims the benefit of U.S. Provisional Patent Application No. 60/487,534 filed Jul. 14, 2003, the disclosure of which is hereby incorporated herein by reference.

STATEMENT REGARDING FEDERALLY SPONSORED RESEARCH OR DEVELOPMENT

The present invention was made with support from the United States Government under Contract No. F33615-00-C-1674 for an Agile Waveform Generation and Frequency Conversion. The U.S. Government has certain rights in the invention.

TECHNICAL FIELD

This invention provides a multi-wavelength photonic oscillator (MWPO) that generates a multi-wavelength optical waveform in which each wavelength is amplitude modulated with a common low noise RF tone or family of tones.

BACKGROUND OF THE INVENTION

The invention extends the prior concepts of a multi-tone photonic oscillator and of a single-tone opto-electronic oscillator to multiple optical wavelengths. The prior approaches supply only a single optical wavelength. Using these prior approaches, a multiple wavelength output would require multiple oscillators, with each oscillator operating at a different optical wavelength. If those oscillators have RF tones of nominally the same frequency modulated onto the optical carrier, the RF signals produced at photodetectors connected to the outputs of those oscillators would have the same frequency. However, those RF signals would not have any phase coherence. There is a need for the generation of phase-coherent RF tones on optical carriers having different wavelengths.

Prior art photonic oscillators (also called opto-electronic oscillators) are described in U.S. Pat. Nos. 5,723,856 and 5,777,778 by Yao and Maleki of JPL. The photonic oscillator of these prior inventions comprises an electro-optic modulator, a photodetector and a feedback loop that goes from the optical output of the modulator into the optical input of the photodetector, then electrically out of the photodetector and into the electrical drive input of the modulator; with the loop gain being greater than one. An optical source, such as a pump laser, supplies the light that goes into the modulator. Part of the light output from the modulator is diverted into the feedback loop.

A photonic oscillator that applies a multi-tone RF modulation on a single wavelength optical carrier without using a separate electronic RF oscillator is disclosed in PCT patent application Ser. No. PCT/US02/36849 filed Nov. 15, 2002 by HRL Laboratories, Yap and Sayyah entitled "Agile Spread Waveform Generator and Photonic Oscillator" which application is owned by the assignee of the present application.

These prior inventions do not make any assertions regarding the wavelength or wavelengths of light provided by the optical source. The optical wavelength of the light is not a characteristic that is a point of concern in these prior inventions and no mention is made of the wavelength. Also, no distinction is made between the wavelength or wavelengths of the light that is diverted into the loop compared to those not diverted into the feedback loop. What is considered important in these prior inventions, instead, is the optical power of that light, which, if sufficiently high, can supply the necessary energy to sustain the oscillation.

These prior photonic oscillators do not specifically produce optical outputs that have multiple wavelengths nor are their output wavelengths necessarily suitable for distribution of the light by a WDM network. The multi-wavelength capability of the present invention is one feature that is of benefit to the art.

Figures 6, 6A:
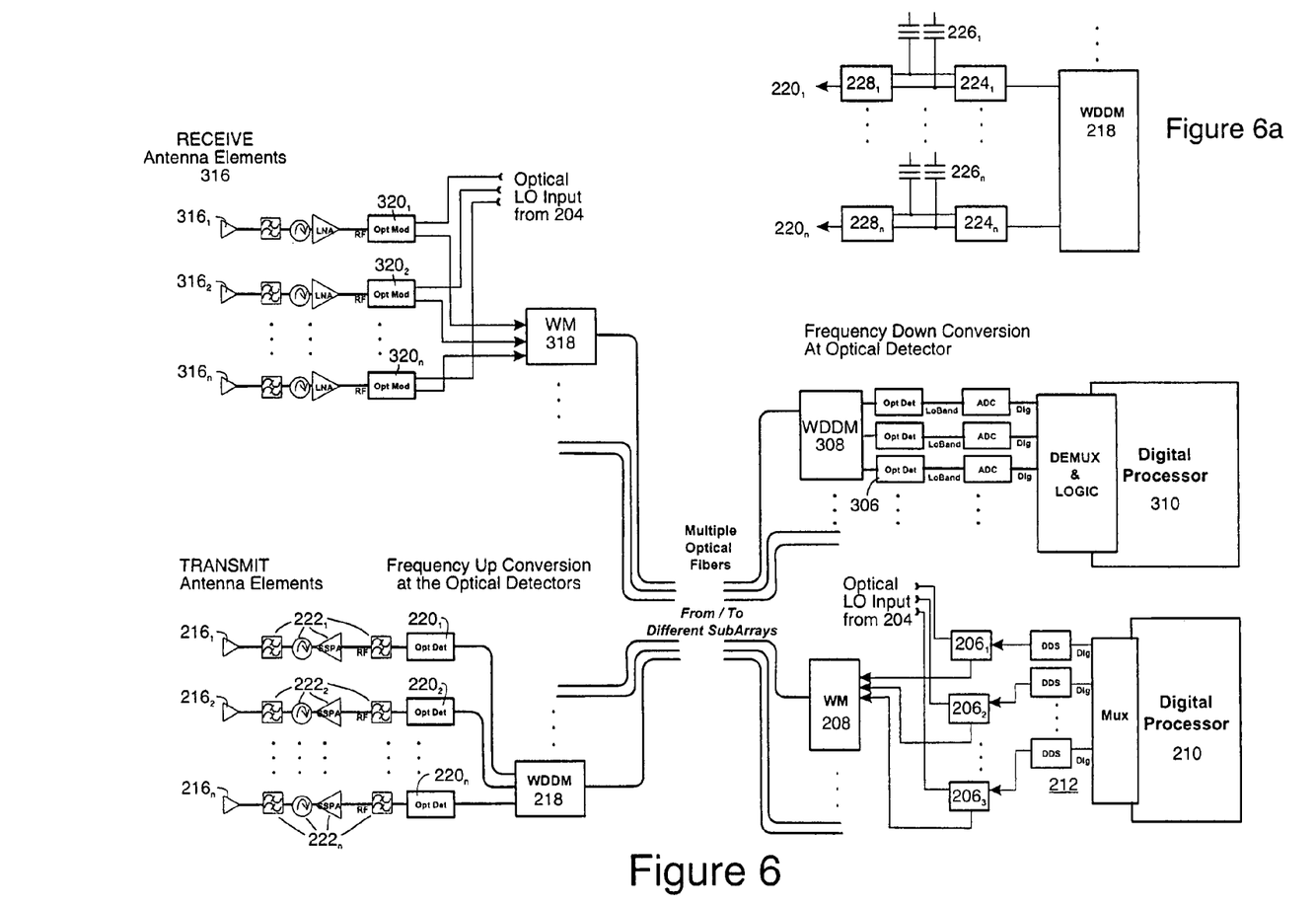
FIG. 6 illustrates the application of optical frequency conversion and optical data distribution in an antenna system with digital beam forming.
FIG. 6a depicts a modification to FIG. 6 to implement photonic beam forming.

Digital beam forming is being developed for phased array antennas that have multiple beams. Typically, a different digital beam forming signal is generated for each antenna element. This signal can contain the data to be transmitted and also the phase information for forming the antenna beam. This signal is then frequency-converted to the desired RF carrier and supplied to the antenna element. As illustrated in FIG. 6, optical links can be used to carry the data from a central processor, which generates the beam forming information, to the antenna. An optical heterodyning technique can be used to also accomplish the frequency conversion as part of the optical distribution of the data. Alternatively, a cascade of two electro-optic modulation units can accomplish the frequency conversion. Since different signals are needed for each antenna element, many optical links would be needed, one for each antenna element. To reduce the number of optical fibers required, it may be advantageous to use a WDM network to carry signals between the processor and the antenna. A single optical fiber could carry the signals for a subarray of multiple elements. Each element of the subarray would be distinguished by a different optical wavelength. These multiple optical wavelengths would be carried in the same fiber.

BRIEF DESCRIPTIONS OF THE INVENTION

In one aspect, the present invention involves the supply of multiple optical wavelengths into the optical modulator of a photonic oscillator combined with the use of a subset of those optical wavelengths (as the control wavelengths) in an opto-electronic feedback loop of the oscillator. The optical modulator applies a single or multi-tone RF modulation onto the multiple optical wavelengths. In a first embodiment, light at a control wavelength is diverted into a feedback loop, while light at the other wavelengths does not go through the feedback loop and is supplied as the output of the photonic oscillator.

An optical wavelength division multiplexing (WDM) network can then distribute this light to multiple photodetectors associated with antenna elements, with one or more wavelengths reaching each such photodetector. The desired phase-coherent RF signals are obtained at the terminal photodetectors. The feedback loop comprises one or more optical delay paths and various combinations of optical and electronic gain elements (amplifiers), optical and electronic filters, optical and electronic phase shifters, and photodetectors.

The effect of the feedback loop is to delay the RF modulated optical signal at a control wavelength, convert that signal into a RF electrical signal and use that delayed electrical signal to drive the optical modulator. When the gain of the feedback loop is greater than one, oscillation occurs. In contrast to the prior approaches, this RF feedback signal modulates light at multiple optical wavelengths. The time delays from the various paths of the feedback loop determine the frequency or frequencies of the modulation. The filters in the loop determine the number of modulation frequencies or tones. The RF modulations on the various optical wavelengths are coherent because the same optical modulator (which is a part of the feedback loop) produces those modulations. As will be seen, the various wavelengths of light do not all have to go through the feedback loop. The multi-wavelength light is preferably supplied by multiple single-wavelength lasers. It also could be supplied by one or more multi-wavelength laser sources. The design of the light source may not be particularly important for certain embodiments of this invention. But, for other embodiments, the design of the light source may well be important particularly if unwanted cross modulation products, which can be generated by the loop photodetectors, are to be avoided.

In one aspect, the present invention provides for photonically generating a RF oscillation that does not require a separate electronic RF oscillator and that also produces such oscillation as modulation sidebands on multiple optical carriers of different wavelengths. There is a prior HRL invention disclosure that discusses application of the same set of RF modulation sidebands (produced by driving an optical modulator with the output of an electronic RF oscillator) on multiple optical carriers of different wavelengths (see PCT application PCT/US02/36845 filed Nov. 15, 2002 by HRL Laboratories and Yap, the disclosure of which is hereby incorporated herein by reference). The disadvantage of this prior approach is its need for a separate electronic oscillator, which can be costly if low phase noise is required.

DETAILED DESCRIPTION

Figure 1:
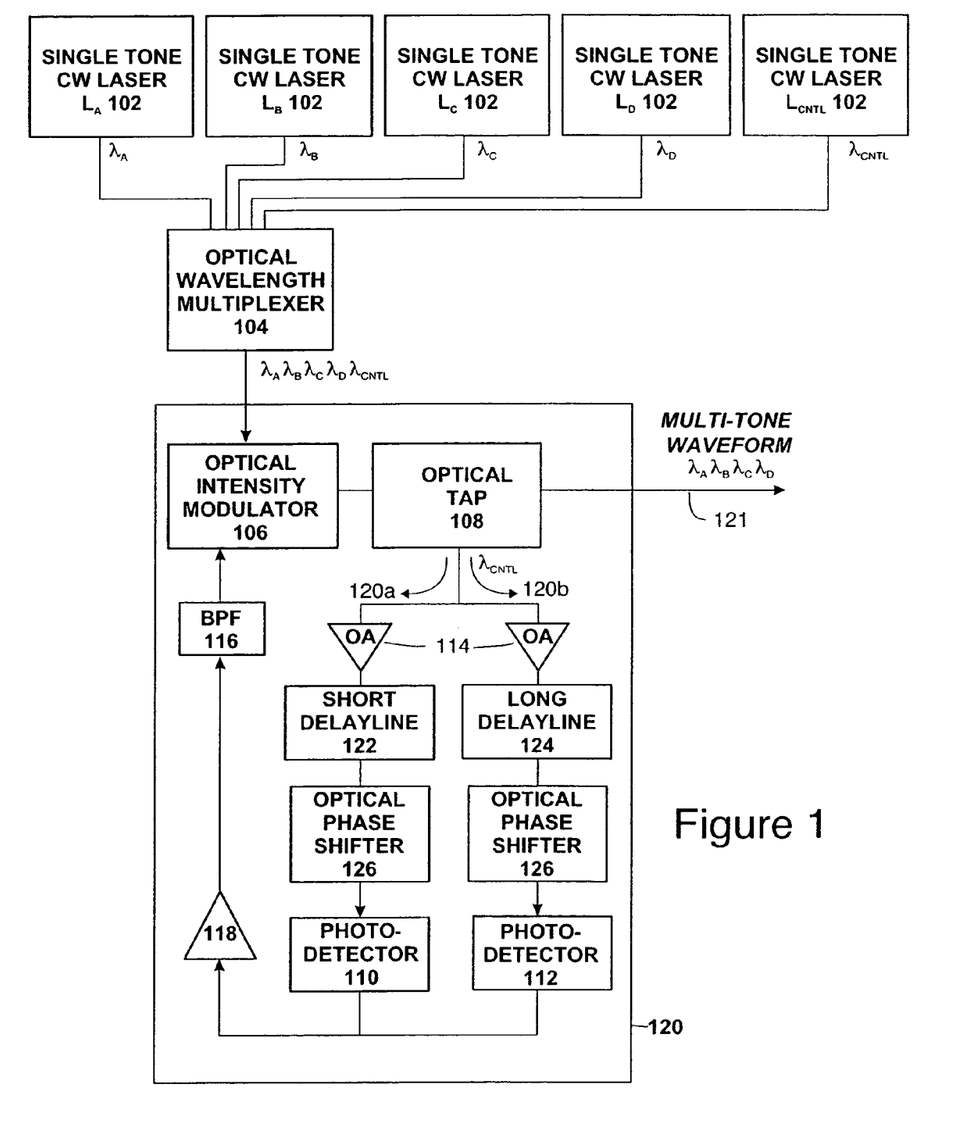
FIG. 1 illustrates a preferred embodiment of a multi-wavelength photonic oscillator (MWPO)
Figure 5:
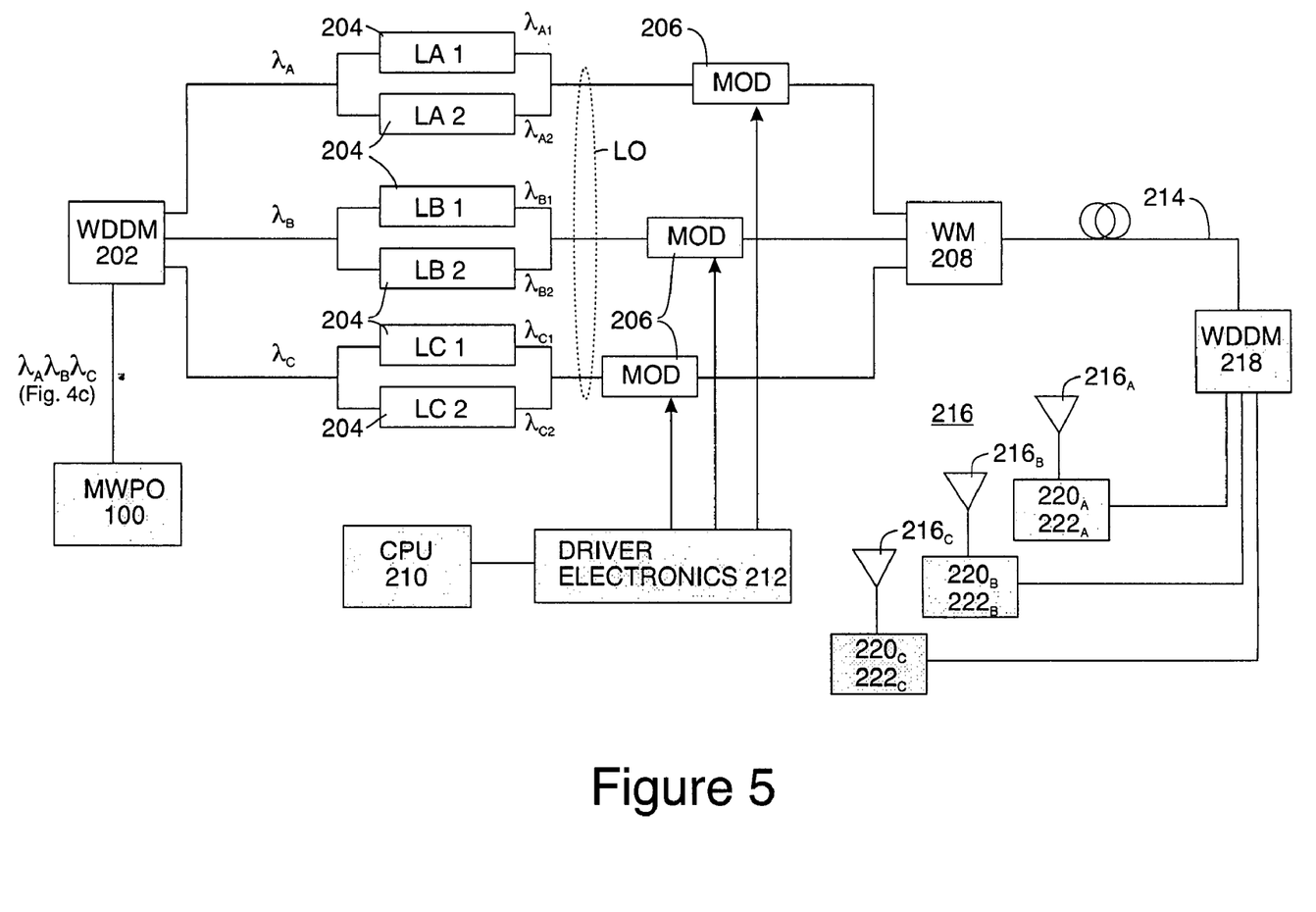
FIG. 5 illustrates the use of a MWPO as a master laser source for optical injection locking pairs of slave lasers within a WDM framework.

A preferred embodiment of a multi-wavelength photonic oscillator (MWPO) 100 in accordance with the present invention is illustrated in FIG. 1. It comprises multiple lasers 102 $L_A$-$L_D$ (which each emit light at a different wavelength or optical frequency), an optical wavelength multiplexer 104, an optical modulator 106, an optical wavelength selector 108 and photodetectors 110 and 112 connected in a closed feedback loop 120. The loop may also include optical amplifiers 114 and/or electronic amplifiers 118, optical phase shifters 126, 128, an electronic phase shifter (not shown, but disposed in the electronic portion of the loop) and a bandpass filter 116. One laser wavelength $\lambda_{CNTL}$ is directed into the feedback loop 120 and the other laser wavelengths (e.g., $\lambda_A$, $\lambda_B$, $\lambda_C$, $\lambda_D$) are provided as outputs of the MWPO 100. These outputted wavelengths can be associated with various optical WDM channels in a digital beam forming signal distribution system (as illustrated in FIG. 6) or with various pairs of laser diodes for optical injection locking (as illustrated in FIG. 5). The MWPO 100 accomplishes RF modulation of the multiple laser wavelengths using a single feedback loop and without needing a high frequency electronic oscillator. An electronic filter 116 in the feedback loop 120 selects the range of RF modulation frequencies that can be sustained by the oscillator. The feedback loop 120 shown in FIG. 1 has two optical paths or channels 120a and 120b, with each optical path or channel including at least a photodetector 110, 112 and possibly also an optical amplifier 114 and an optical phase shifter 126, 128. One path, 120a, is shorter having a relatively short delay line 124 therein (which can be implemented by a relatively shorter length of optical fiber). The other path, 120b, is longer, typically comprising a relatively long delay line 124 (which can be implemented by a relatively longer length of optical fiber). Preferably, the closed loop gain resulting from the combination of all paths is greater than one.

The delay time of each path determines a set of RF oscillation frequencies that can be modulated onto the light by the optical modulator 106. The longer path defines relatively narrow-spaced frequency sidebands 134 (see FIG. 4b) while the shorter path defines relatively broadly-spaced frequency sidebands 132 (see FIG. 4a). The combination of paths selects the subset of RF oscillation frequencies that the various paths have in common (see FIG. 4c). The number of tones from the two loops which are selected depends on the passband of filter 116. The RF signal is produced at a photodetector located at the end of the optical fiber that is the output port of the MWPO 100. Such a photodetector 220 is shown in application of MWPO 100 depicted by FIGS. 5 and 6, for example.

Figure 4A:
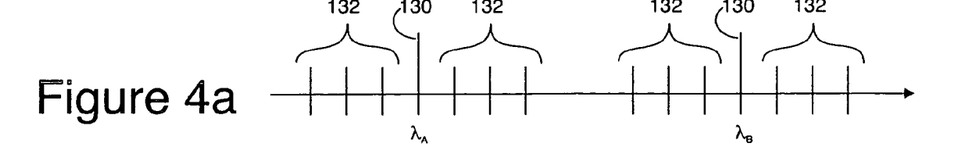
FIGS. 4a-4f illustrate multi-tone waveforms that can be generated by the present invention and the bandpasses of associated photodetectors of the embodiment of FIG. 3.
Figure 4B:
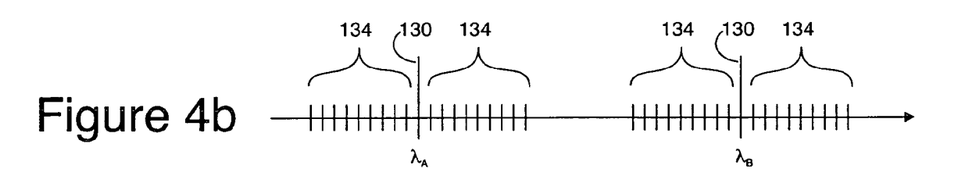
Figure 4C:
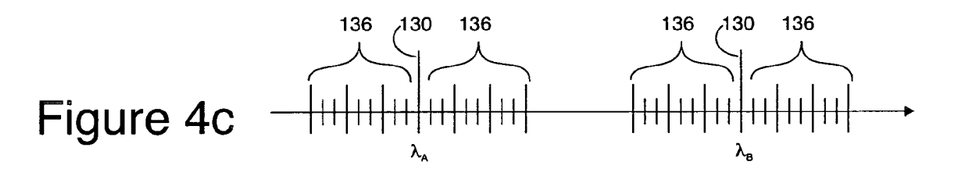
Figure 4D:
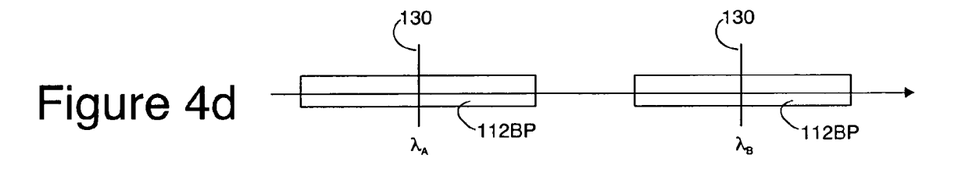
Figure 4E:
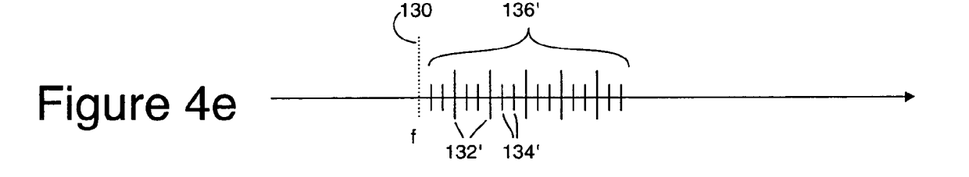
Figure 4F:
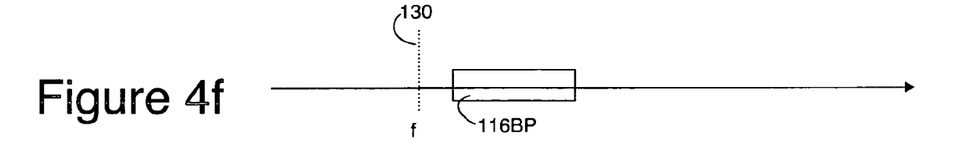

FIGS. 4a-4f show tones produced by various aspects of the disclosed circuitry. FIGS. 4a-4c show the tones, expressed as wavelengths, produced in the optical portions of the circuity. FIG. 4a shows the relatively wider spaced tones defined by the shorter loop, while FIG. 4b shows the relatively closer spaced tones defined by the longer loop. FIG. 4c shows how the combination of the two loops select a subset of RF oscillation frequencies that the two paths have in common. FIG. 4d shows the bandpass of the photodetector 220 (see FIGS. 5 and 6) where the conversion to electrical RF signals occurs. FIG. 4e shows the tones in the frequency domain after conversion to electrical RF tones. To distinguish the tones in the frequency domain from the wavelength domain, prime marks (') are added after the reference numerals. FIG. 4f shows the bandpass of filter 116 and its relationship to the subset of FIG. 4e.

If the length of the longer delay line 122 has a controlled value and is of a relatively long length (typically comprising 1000s of meters of optical fiber), the MWPO 100 can produce multiple RF tones 134' at a photodetector 220 connected to its output port 121 and the spacing between those tones 134', which is determined by the delay time associated with the longer delay line 122, will be much shorter than the spacing between the RF tones 132'.

If the length of the shorter path 120a is very short, typically comprising less than 2 meters of optical fiber, the MWPO can produce a single RF tone at photodetector 220 connected to its output port. In this case, the oscillator loop of the MWPO functions in a manner similar to the loops described in U.S. Pat. No. 5,777,778.

If the length of the shorter loop has a controlled value and is of moderate length (typically comprising 4-100 meters of optical fiber), the MWPO 100 can produce multiple RF tones 132 at photodetector 220 connected to its output port 121. The spacing between those tones 132 as determined by the delay time associated with the shorter delay line 122 is smaller than in the preceding case. In this case, the oscillator loops of the MWPO 100 function in a manner similar to the loops described in the aforementioned PCT application Serial No. PCT/US02/36849 filed Nov. 15, 2002 by HRL Laboratories, Daniel Yap and Kayvan Sayyah.

In general the laser wavelengths (e.g., $\lambda_A$, $\lambda_B$, $\lambda_C$, $\lambda_D$) output from the MWPO 100 are selected to match the wavelengths of the channels in a WDM network (see FIG. 6). These typically are the wavelengths associated with the wavelength multiplexers (WM) and the wavelength demultiplexers (WDDM) of the network. The International Telecommunications Union (ITU) has defined a set of standard wavelengths for WDM systems and the present invention is well-adapted to supply such a set of standard wavelengths. The control wavelength, $\lambda_{CNTL}$, can be selected to best suit the components in the feedback path of the MWPO 100.

A feature of this embodiment is that the optical powers at the wavelengths $\lambda_A$, $\lambda_B$, $\lambda_C$, $\lambda_D$ can be selected to suit the intended use of the light at those wavelengths.

For example, if that light is used to provide a master oscillator signal for injection locking a pair of slave lasers, the intensity at a given wavelength can be chosen to achieve a desired injection locking bandwidth or phase noise. The optical power at the wavelength $\lambda_{CNTL}$ is preferably selected to achieve low phase noise for the MWPO tones.

The phase noise of a photonic oscillator and its dependence on parameters such as optical power has been analyzed by various authors (e.g., by Yao and Maleki in J. Opt. Soc. Am. B, vol. 13, no. 8, pp. 1725-1735; and by Sayyah and Yap in SPIE Proc., vol. 4490, pp. 52-62).

Figure 2:
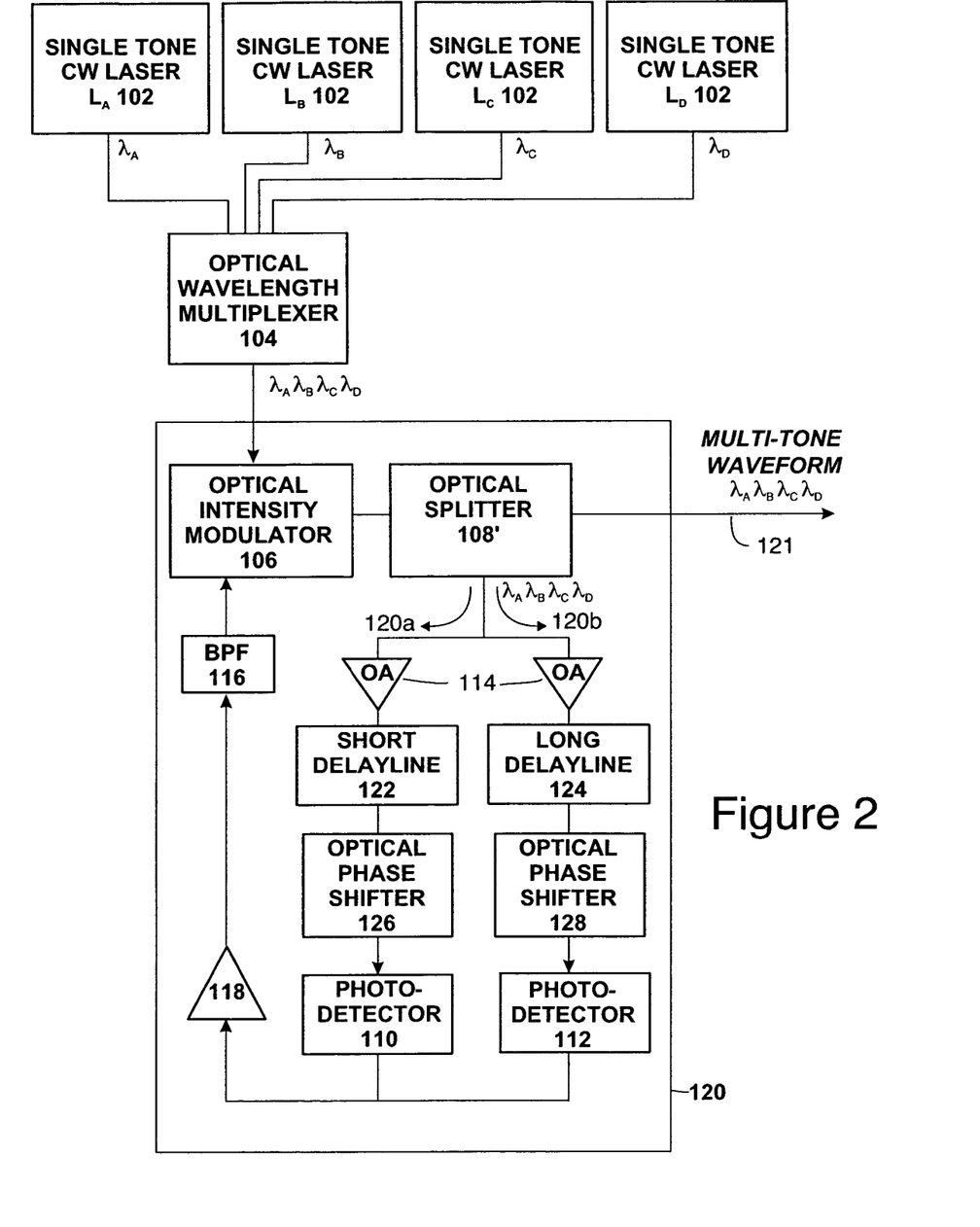
FIG. 2 illustrates a second embodiment of a multi-wavelength photonic oscillator.

Another embodiment of the MWPO 100 is illustrated in FIG. 2. This MWPO 100 comprises multiple lasers 102 (which emit at different wavelengths or optical frequencies), an optical wavelength multiplexer 104, an optical modulator 106 and photodetectors 110 and 112 connected as a closed feedback loop 120. The loop 120 optionally includes optical amplifiers 114 and/or electronic amplifiers 118, optical phase shifters 122, 124 and/or electronic phase shifters (not shown, but would occur in the electronic portion of the loop) and filters 116. A portion of the laser light in all of the laser wavelengths (e.g., $\lambda_A$, $\lambda_B$, $\lambda_C$, $\lambda_D$) is diverted into the feedback path 120 by an optical splitter 108'. The remaining portion of the laser light in all of the wavelengths is provided as an output 100a of the MWPO 110. These wavelengths can be associated with and supplied to various pairs of laser diodes for optical injection locking (as illustrated in FIG. 5). They also can be associated with various optical WDM channels in a digital beam forming, signal distribution system (as illustrated by FIG. 6). As in the first embodiment of FIG. 1, the MWPO 100 accomplishes RF modulation of the multiple laser wavelengths using a single feedback loop 120 and without needing a high frequency electronic oscillator. An electronic filter 116 in the feedback loop 120 selects the range of RF modulation frequencies that can be sustained by the oscillator. The feedback loop 120 shown in FIG. 2 has two optical paths 120a and 120b, with each path containing at least a photodetector 110, 112 and possibly also an optical amplifier 114. One path, 120a, is shorter and can contain an optical phase shifter 126. The other path, 120b, is longer, typically comprising a long length of optical fiber 124. Preferably, the closed loop gain resulting from the combination of all paths is greater than one. The delay time of each path determines a set of RF oscillation frequencies that are modulated onto the multi-wavlength light by the optical modulator. The combination of paths selects the subset of RF oscillation frequencies that the various paths have in common. The resultant RF signal is produced at a photodetector 220 (see FIGS. 5 and 6) that may be connected to the optical fiber that is the output port 121 of the MWPO 100.

The main distinction between the two embodiments of FIGS. 1 and 2 is that in the second embodiment all of the wavelengths are coupled into the feedback loop 120. Thus, the total amount of optical power carried in the loop determines that total photodetector current for the loop. The optical splitter 108' controls the amount of power diverted into the loop 120. Note that the optical amplifiers 114, optical phase shifters 126, 128 and photodetectors 110, 112 must be compatible with the various wavelengths of the light coupled into the loop 120.

The reason that this second embodiment is less preferred than the first embodiment is the increased constraints this embodiment places on the wavelengths and powers of the lasers 102. Otherwise, both embodiments should provide suitable signals for the various applications described herein.

In the case of the first embodiment, the only restriction placed on the lasers $L_A$-$L_D$ that supply the light wavelengths that are output from the MWPO 100, but are not coupled into the feedback loop 120, is that their output wavelengths can be combined with the WM 104 shown in FIG. 1 and that those output wavelengths are not selected by the wavelength selective tap 108 shown in FIG. 1. Those lasers $L_A$-$L_D$ can, in fact, be mode locked lasers that produce pulsed light. The optical spectra of the pulsed light occupy a range of wavelengths, all of which would be in the passbands of the WM 104. Also, it is possible to have a MWPO 100 for which some of those lasers $L_A$-$L_D$ could generate pulsed light and yet other lasers would generate continuous (CW) light. In fact, it is possible to select a modulator 106 for the loop that can accommodate optical wavelengths in the range of 1.3-1.55 micrometers. Then, the control laser $L_{CNTL}$ of FIG. 1 could, for example, emit at 1.3 micrometers and the other lasers 120 ($L_A$-$L_D$) could emit in the range of 1.55 micrometers. Many 1.3 micrometer wavelength lasers with the high power and low RIN useful for the feedback loop 120 have been achieved. Yet other embodiments of the MWPO 100 can be constructed by combining the features of the two embodiments described herein. For example, a MWPO 100 can have several (control) wavelengths of light diverted into the feedback loop and several other wavelengths of light that are not coupled into the loop but only directed to the output of the MWPO 100. Some or all of the control wavelengths also could be directed to the output of the MWPO 100.

Figure 3:
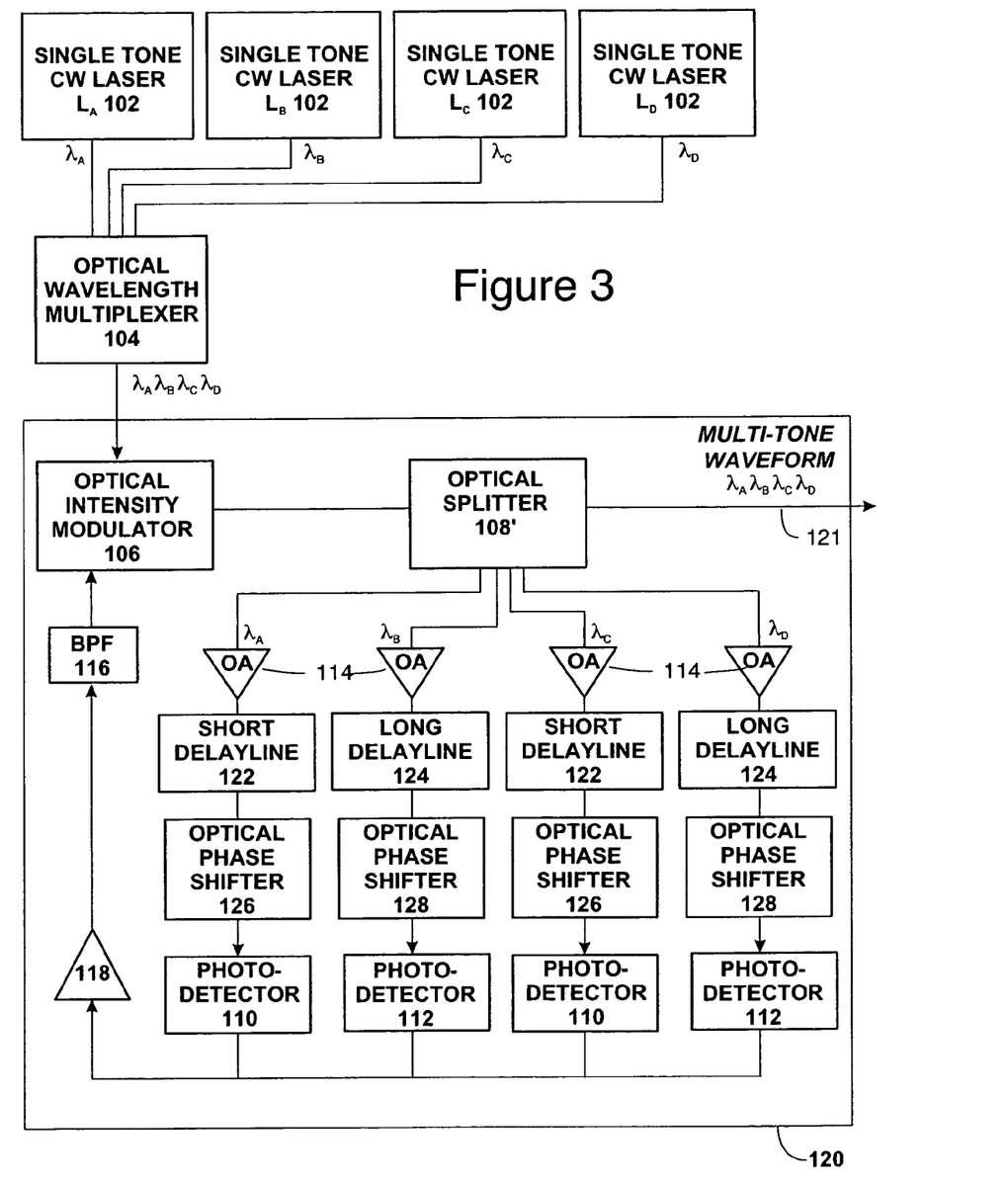
FIG. 3 illustrates a third embodiment of a multi-wavelength photonic oscillator.

FIG. 3 shows yet another embodiment of MWPO 100. Before discussing FIG. 3, the reader should review FIGS. 4a-4d first (and the following discussion), as that will make the reasons why the embodiment of FIG. 3 has certain possible advantages over the embodiment of FIG. 2 easier to understand.

FIG. 4a illustrates the sidebands 132 which are produced in the relatively shorter delay line 122 while FIG. 4b illustrates the sidebands 134 which are produced in the relatively longer delay line 124. If a feedback loop 120 only has one delay line, then only one set of sidebands 132 or 134 will be generated. If a feedback loop 120 only has two delay lines, as shown in FIGS. 1 and 2, then the two sets of sidebands 132 and 134 will be generated as illustrated by FIG. 4c, with the two sets of sidebands being interleaved as a single pair of sidebands 136. The spacings of the tones in the sidebands 134 may be much finer than the spacings of the tones in sidebands 132. Indeed, the spacings of the tones in the sidebands 132 might fall in the range of KHz to MHz while spacings of the tones in the sidebands 134 might fall in the range of MHz to GHz. The spacings of the carrier frequencies 130 of lasers 102 might fall in the range of tens to hundreds of GHz.

If the sidebands of one carrier frequency 130 were to overlap the sidebands of another carrier frequency, then in the case of the embodiment of FIG. 2, undesirable cross modulation products could be formed in the photodetectors 110, 112. But, by the same token, there may well be embodiments where it is desired to overlap the sidebands of one carrier frequency 130 with the sidebands of another carrier frequency 130 without creating optical cross modulation products in the photodetectors 110, 112. The embodiment of FIG. 3 permits the sidebands of one carrier to overlap those of another without the cross modulation problem by utilizing a tap 108' which is implemented as a demultiplexer which separates the desired wavelengths onto separate paths or channels each having a detector 110 or 112. FIG. 4d shows the pass bands of the photodetectors 110, 112 associated with the loops and the relationship to the sidebands 132, 134. While the pass bands of the photodetectors 110, 112 are not shown as overlapping in FIG. 4d, they may indeed overlap and since the photodetector 110, 112 pass bands are only associated with the expected frequencies in any given channel, optical cross modulation is avoided. Since the embodiment of FIG. 3 is otherwise similar to the embodiment of FIG. 2, for example, the other components are not further described at this point.

One exemplary application of the MWPO 100 is for phase locking various pairs of laser diodes 204 by an optical-injection locking process, as illustrated in FIG. 5. This optical injection locking process results in optical local oscillator (LO) signals carried on multiple wavelengths that can be applied to the network illustrated in FIG. 6, for example. Optical LO signals for frequency conversion also can be obtained directly from the output of the MWPO 100. However, with this latter technique, the frequency conversion is generally less efficient. Note that each laser diode pair 204 shown in FIG. 5 has the same optical frequency difference (i.e., producing the same LO frequency) if the MWPO 100 is arranged to produce a single RF tone (one tone can have three optical frequencies-carrier and two side tones). For a digital beam formed antenna system or a full duplex, radio-on-fiber application, it is preferable to have all laser pairs 204 produce the same LO frequency. However, different LO frequencies are preferably produced by the different pairs of lasers 204, for some multi-frequency radar systems. In such cases, the MWPO 100 can be arranged to produce multiple RF tones and each pair of lasers 204 could produce a different LO frequency that corresponds to different pairings of the RF tones, with each pairing having a different optical frequency difference.

The various output wavelengths of the MWPO 100 are separated by a wavelength demultiplexer (WDDM) 202. Each wavelength is fed to a different pair of slave lasers 204. For each slave laser 204 pair, one slave laser is set so that its free-running wavelength matches the carrier frequency or a modulation sideband in the optical signal supplied to it from the MWPO 100. The other slave laser is typically set so that its free-running wavelength matches a different modulation sideband (or, alternatively, the carrier frequency). Use of amplitude modulation sidebands to optically injection lock a laser is well known and therefore not described in greater detail here. Use of a pair of lasers to generate an optical heterodyne output suitable for generating a RF LO signal also is well known and therefore also is not described in detail here.

Different beam forming information or data could be modulated onto the optical heterodyne output produced by each pair of slave lasers 204 by optical modulators 206. This information or data could be supplied by a CPU 210 and drive electronics 212 to drive an optical modulator (MOD) 206 that follows each pair of slave lasers 204. The outputs of the optical modulators 206 can then be multiplexed together (using an optical wavelength multiplexer, WM 208) and then carried on a single optical fiber 214 to the antenna subarray location 216. At the subarray location 216, a second WDDM 218 divides the various optical signals according to their wavelengths. Each wavelength is then directed to a different antenna element $216_A \ldots 216_C$ of that subarray via an associated photodetector-amplifier circuit $220_A \ldots 220_C$, $222_A \ldots 222_C$.

Turning now to FIG. 6, a digital beam forming apparatus for phased array antennas 216, 316 that have multiple beams is depicted. Typically, a different digital beam forming signal is generated for each antenna element $216_1$-$216_n$. This signal can contain the data to be transmitted and also the phase information for forming the antenna beam. This signal is then frequency-converted to the desired RF carrier and supplied to the antenna element. As illustrated in FIG. 6, optical links can be used to carry the data from a central processor 210, which generates the beam forming information, to the antenna elements $216_1$-$216_n$. An optical heterodyning technique can be used to also accomplish the frequency conversion as part of the optical distribution of the data. Alternatively, the modulated output of the MWPO, when further modulated by the digital beam forming signal and then being photodetected, also can accomplish frequency conversion. Since different signals are needed for each antenna element, many optical links would be needed, one for each antenna element. To reduce the number of optical fibers required, it may be advantageous to use a WM/WDDM network 208, 218 to carry signals between the processor 210 and the antenna elements $216_1$-$216_n$. A single optical fiber could carry the signals for a subarray of multiple elements. Each element of the subarray would be distinguished by a different optical wavelength. These multiple optical wavelengths would preferably be carried in the same fiber.

It should be recalled that it has already been mentioned that the wavelengths outputted by a MWPO 100 can be associated with various optical WDM channels in a digital beam forming signal distribution system and, as mentioned with reference to FIG. 5, the RF modulated signal produced by a MWPO 100 can be used to optically injection lock a pair of single-wavelength lasers 204 to generate a two-tone, optical local oscillator (LO) signal for the optical heterodyning (heterodyning is used to frequency up-convert the transmitted signal and to down-convert received signals). The two-tone optical signal is supplied to an optical modulator 206, which, for the Transmit path, modulates the desired data and possibly also beam forming information onto that optical signal. A frequency up-converted RF signal is then obtained at a photodetector $220_1$-$220_n$ located at the end of the optical link (i.e., at or near the antenna elements $216_1$-$216_n$). Following the approach described in the preceding paragraph, each antenna element of a subarray is supplied a modulated two-tone signal of a different nominal wavelength. For steering a phased array antenna, the RF phases of the frequency converted signals obtained at different antenna elements should be coherent with each other. This coherence is achieved if heterodyned beats of the two tone signals are mutually coherent. Although each two-tone signal is generated by a different pair of lasers (with each pair set to a different wavelength), the heterodyned beats signals of those lasers are mutually coherent because those lasers all are optically injection locked with a RF modulated signal produced by the same MWPO 100, albeit at different optical wavelengths. Likewise, for the Receive path, an optical modulator 320 is located preferably at or near each antenna element $316_1$-$316_n$. The signal received by that element then drives the associated modulator 320 to modulate the two-tone signal distributed to that modulator by WDM 322.

The frequency up-converted RF signals obtained at photodetectors $220_1$-$220_n$ are amplified, preferably by a Solid State Power Amplifier (SSPA) and filter elements $222_1$-$222_n$ associated with each antenna $216_1$-$216_n$. The transmit antenna elements $216_1$-$216_n$ and the receive antenna elements $316_1$-$316_n$ may be shared or closely located and those skilled in the art will appreciate that, in that event, the filters in elements $222_1$-$222_n$ would typically include circulators to help isolate the receive circuits from the transmit circuits.

The use of the MWPO 100 permits a single MWPO 100 to be used for each subarray, or even for multiple subarrays. No electronic RF oscillator is needed for generating the LO signal. Also, an optical fiber WM/WDDM network can be used instead of electrical cables and electronic switch network to interconnect the processor with the antenna. Prior approaches for digital beam forming place electronic processors at each antenna element that generate the beam-forming information (and possibly also the data) for that element. Thus, the power supply and dissipation requirements and the weight at the antenna elements would be increased substantially compared to the embodiment of FIG. 6. Indeed, by placing the photodetectors $220_1$-$220_n$ at or near antenna elements $216_1$-$216_n$ the frequency up-conversion occurs near the antenna elements $216_1$-$216_n$ resulting in a considerable savings in weight (optical cables weigh less than traditional shielded copper cables) and allowing the digital processor 210 to be remotely located relative to the antenna elements $216_1$-$216_n$.

The digital beam forming apparatus of FIG. 6 can be modified to use other beam forming techniques. For example, conventional analog beam forming techniques could be utilized by utilizing conventional analog circuit techniques downstream of the transmit photodetectors 220. Additionally, the beam former apparatus of FIG. 6 can be modified to utilize photonic beam forming. FIG. 6a shows a modification that can be made to FIG. 6 to provide for photonic beam forming. In FIG. 6a, the outputs of the WDDM 218, instead of being directly coupled to modulators $218_1$-$218_n$, are coupled via 1×M photonic switches $224_1$-$224_n$, chirped fibre gratings $226_1$-$226_n$, and M×1 opto-couplers $228_1$-$228_n$. The chirped fibre gratings $226_1$-$226_n$ impose different delays on the optical signals. Each antenna may have M chirped fibre gratings associated therewith. As drawn in FIG. 6a, M equals two, so there are two possible delays which can be imposed on each photodetected signal according to FIG. 6a. Of course, the number of chirped fibre gratings $226_1$-$226_n$ associated with each antenna is the number M, where M=1, 2, 3 . . . Instead of using chirped fibre gratings to impose a delay, more traditional delay elements (such as preselected lengths of fibre optic cable) can be used instead between the 1×M opto-switches $224_1$-$224_n$ and the M×1 opto-couplers $228_1$-$228_n$. Chirped fibre gratings can also be used on the input to the WDDM 218. Switches $224_1$-$224_n$ are preferably controlled by processor 210 to adjust the phases of the signals reaching modulators $218_1$-$218_n$ so as to direct (form) a RF beam transmitted by antennas $216_1$-$216_n$.

With respect to the receiving function of the antenna, the optical local oscillator signals, one each supplied from each pair of single wavelength lasers 204, are directed to a group of optical modulators $320_1$-$320_n$. Each modulator $320_1$-$320_n$ of this group receives light of a different wavelength, that light also containing information on the local oscillator frequency. Each of the modulators $320_1$-$320_n$ modulates onto the light it receives the RF signal received by the antenna element $316_1$-$316_n$ associated with that modulator. Light from the multiple modulators $320_1$-$320_n$ is multiplexed together by a multiplexer 318 and thence carried by optical filters to a wavelength division demultiplexer (WDDM) 308 and then separately directed to optical photodetectors 306. The frequency down-converted intermediate frequency (IF) or baseband signals are then produced by these photodetectors 306. The time delays for photonic beamforming can be achieved by placing elements of FIG. 6a1 (i.e. elements 224, 226, and 228) between demultiplexer 308 and photodetectors 306.

Having described this invention in connection with a number of embodiments, modification will now certainly suggest itself to those skilled in the art. As such, the invention is not to be limited to the disclosed embodiments except as required by the appended claims.

What is claimed is:

1. A multi-wavelength photonic oscillator comprising:
   (a) a plurality of lasers each emitting light at a different frequency;
   (b) an optical wavelength multiplexer for combining the light emitted by the plurality of lasers at an output thereof as a set of optical wavelengths; and
   (c) an optical modulator arranged in a feedback loop and coupled to receive light at the output of the optical wavelength multiplexer, the feedback loop having a loop gain greater than unity and including:
      (i) an optical tap for coupling at least a subset of said set of optical wavelengths to at least one optical output of said multi-wavelength photonic oscillator;
      (ii) at least one optical channel having an associated photodetector arranged to receive light from the optical tap via the at least one optical channel; and
      (iii) an electronic loop portion coupled to receive output from the at least one associated photodetector and to provide an input for the optical modulator.

2. The multi-wavelength photonic oscillator of claim 1 wherein the feedback loop has a plurality of optical channels with one optical channel imposing more delay than another optical channel with each associated photodetector in the plurality of optical channels having an output combined at a common electrical output for connection to said electronic loop portion.

3. The multi-wavelength photonic oscillator of claim 2 wherein at least one of an optical portion of the loop and the electronic loop portion includes an amplifier to ensure that a loop gain for the feedback loop exceeds unity.

4. The multi-wavelength photonic oscillator of claim 3 wherein at least one of the optical portion of the loop and the electronic loop portion includes phase shifting means.

5. The multi-wavelength photonic oscillator of claim 4 wherein the electronic loop portion includes a bandpass filter and wherein the input for the optical modulator is an electronic input.

6. The multi-wavelength photonic oscillator of claim 1 wherein the optical tap is wavelength sensitive for directing light of a wavelength associated with a frequency of one of the lasers of said plurality of lasers into said feedback loop and for directing light of wavelengths associated with frequencies of other ones of the lasers of said plurality of lasers to said at least one optical output of the multi-wavelength photonic oscillator.

7. The multi-wavelength photonic oscillator of claim 6 wherein the feedback loop has a plurality of optical channels with one optical channel imposing more delay than another optical channel with each associated photodetector in the plurality of optical channels having an output combined at a common electrical output for connection to said electronic loop portion.

8. The multi-wavelength photonic oscillator of claim 7 wherein at least one of an optical portion of the loop and the electronic loop portion includes an amplifier to ensure that the loop gain for the feedback loop exceeds unity.

9. The multi-wavelength photonic oscillator of claim 8 wherein at least one of the optical portion of the loop and the electronic loop portion includes phase shifting means.

10. The multi-wavelength photonic oscillator of claim 9 wherein the electronic loop portion includes a bandpass filter and wherein the input for the optical modulator is an electronic input.

11. The multi-wavelength photonic oscillator of claim 1 wherein said feedback loop includes a plurality of parallel-arranged optical channels and wherein the optical tap is wavelength sensitive for directing light of wavelengths associated with frequencies of said plurality of lasers each into different ones of optical channels of said feedback loop.

12. The multi-wavelength photonic oscillator of claim 11 wherein at least one of the optical channels imposes more delay than at least another one of the optical channels, each optical channel having an associated photodetector with a photodetector output, the outputs of the photodetectors in said optical channels being combined at a common electrical output for connection to said electronic loop portion.

13. The multi-wavelength photonic oscillator of claim 12 wherein at least one of an optical portion of the loop comprising said optical channels and the electronic loop portion includes an amplifier to ensure that the loop gain for the feedback loop exceeds unity.

14. The multi-wavelength photonic oscillator of claim 13 wherein each optical channel in the optical portion of the loop has an optical amplifier.

15. The multi-wavelength photonic oscillator of claim 13 wherein at least one of the optical portions of the loop and the electronic loop portion includes phase shifting means.

16. The multi-wavelength photonic oscillator of claim 15 wherein each optical channel in the optical portion of the loop has an optical amplifier and phase shifting means.

17. The multi-wavelength photonic oscillator of claim 16 wherein the electronic loop portion includes a bandpass filter.

18. The multi-wavelength photonic oscillator of claim 1 in combination with:
 (d) a wavelength division demultiplexer coupled to the at least one optical output of the multi-wavelength photonic oscillator; and
 (e) a plurality of slave lasers arranged as pairs of slave lasers, each pair of slave lasers being wavelength-associated with a laser of said plurality of lasers in said multi-wavelength photonic oscillator and being coupled to said multi-wavelength photonic oscillator via said wavelength division demultiplexer.

19. The apparatus of claim 18 wherein one slave laser in each said pair of slave lasers is set so that its free-running wavelength matches a modulation sideband in the optical signal supplied by the multi-wavelength photonic oscillator.

20. The apparatus of claim 19 wherein the other slave laser in each said pair of slave lasers is set so that its free-running wavelength matches a different modulation sideband in the optical signal supplied by the multi-wavelength photonic oscillator.

21. The apparatus of claim 18 wherein one slave laser in each said pair of slave lasers is set so that its free-running wavelength matches a carrier frequency in the optical signal supplied by the multi-wavelength photonic oscillator.

22. The apparatus of claim 21 wherein the other slave laser in each said pair of slave lasers is set so that its free-running wavelength matches a modulation sideband in the optical signal supplied by the multi-wavelength photonic oscillator.

23. The apparatus of claim 18 in combination with a radar or other communication system having optical modulators for modulating signals transmitted thereby, the pairs of slave lasers each producing a local oscillator signal for modulation by the optical modulators in said radar or other communication system.

24. A transmitter comprising:
 (a) optical modulators for modulating optical local oscillator signals;
 (b) photodetectors coupled to outputs of the optical modulators for converting the modulated optical local oscillator signals to electrical radio frequency signals for subsequent application to antenna elements; and
 (c) an apparatus for generating the optical local oscillator signals comprising:
  (i) multi-wavelength photonic oscillator, said multi-wavelength photonic oscillator producing an optical output comprising multiple optical carriers and multiple modulation sidebands, said multiple optical carriers and multiple modulation sidebands being grouped into more than one wavelength region with the optical output at each wavelength region comprising at least an optical carrier and a modulation sideband; and
  (ii) a wavelength division demultiplexer coupled to receive the optical output of the multi-wavelength photonic oscillator, said wavelength division demultiplexer separating the optical output of the multi-wavelength photonic oscillator into more than one of said wavelength regions, with the optical output at each wavelength region comprising at least an optical carrier and a modulation sideband, the output at each wavelength region being suitable for determining a local oscillator frequency.

25. The transmitter of claim 24 wherein the apparatus for generating the optical local oscillator signals further comprises a plurality of slave lasers arranged as pairs of slave lasers, each pair of slave lasers being wavelength-associated with a particular one of said wavelength regions of said multi-wavelength photonic oscillator and being coupled to said multi-wavelength photonic oscillator via said wavelength division demultiplexer.

26. A transmitter comprising:
 (a) optical modulators for modulating optical local oscillator signals;
 (b) photodetectors coupled to outputs of the optical modulators for converting the modulated optical local oscillator signals to electrical radio frequency signals for subsequent application to antenna elements; and
 (c) an apparatus for generating the optical local oscillator signals comprising:
  (i) multi-wavelength photonic oscillator;
  (ii) a wavelength division demultiplexer coupled to an optical output of the multi-wavelength photonic oscillator, said wavelength division demultiplexer separating the optical output of the multi-wavelength photonic oscillator into more than one wavelength region, with the optical output at each wavelength region comprising at least an optical carrier and a modulation sideband, the output at each wavelength region being suitable for determining a local oscillator frequency; and
  (iii) a plurality of slave lasers arranged as pairs of slave lasers, each pair of slave lasers being wavelength-associated with a particular wavelength region of said multi-wavelength photonic oscillator and being coupled to said multi-wavelength photonic oscillator via said wavelength division demultiplexer, and wherein one slave laser in each said pair of slave lasers is set so that its free-running wavelength matches a modulation sideband in an optical signal supplied by the multi-wavelength photonic oscillator.

27. The transmitter of claim 26 wherein the other slave laser in each said pair of slave lasers is set so that its free-running wavelength matches a different modulation sideband in the optical signal supplied by the multi-wavelength photonic oscillator.

28. The transmitter of claim 26 wherein the other slave laser in each said pair of slave lasers is set so that its free-running wavelength matches a carrier frequency in an optical signal supplied by the multi-wavelength photonic oscillator.

29. The transmitter of claim 24 wherein the multi-wavelength photonic oscillator comprises:
   (1) a plurality of lasers each emitting light at a different frequency;
   (2) an optical wavelength multiplexer for combining the light emitted by the plurality of lasers at an output thereof as a set of optical wavelengths; and
   (3) an optical modulator arranged in a feedback loop and coupled to receive light at the output of the optical wavelength multiplexer, the feedback loop further including: an optical tap for coupling at least a subset of said set of optical wavelengths to at least one optical output of the multi-wavelength photonic modulator; at least one optical channel having an associated photodetector arranged to receive light from the optical tap via the at least one optical channel; and an electronic loop portion coupled to receive output from the at least one associated photodetector and to provide an input for the optical modulator.

30. A receiver comprising:
   (a) optical modulators for modulating optical local oscillator signals;
   (b) photodetectors coupled to outputs of the optical modulators for converting the modulated optical local oscillator signals to an electrical intermediate frequency or baseband signal for subsequent processing; and
   (c) an apparatus for generating the optical local oscillator signals comprising:
      (i) multi-wavelength photonic oscillator, said multi-wavelength photonic oscillator producing an optical output comprising multiple optical carriers and multiple modulation sidebands, said multiple optical carriers and multiple modulation sidebands being grouped into more than one wavelength region with the optical output at each wavelength region comprising at least an optical carrier and a modulation sideband; and
      (ii) a wavelength division demultiplexer coupled to receive the optical output of the multi-wavelength photonic oscillator, said wavelength division demultiplexer separating the optical output of the multi-wavelength photonic oscillator into more than one of said wavelength regions, with the optical output at each wavelength region comprising at least an optical carrier and a modulation sideband, the output at each wavelength region being suitable for determining a local oscillator frequency.

31. The receiver of claim 30 wherein the apparatus for generating the optical local oscillator signals further comprises a plurality of slave lasers arranged as pairs of slave lasers, each pair of slave lasers being wavelength-associated with a particular one of said wavelength regions of said multi-wavelength photonic oscillator and being coupled to said multi-wavelength photonic oscillator via said wavelength division demultiplexer.

32. A receiver comprising:
   (a) optical modulators for modulating optical local oscillator signals;
   (b) photodetectors coupled to outputs of the optical modulators for converting the modulated optical local oscillator signals to an electrical intermediate frequency or baseband signal for subsequent processing; and
   (c) an apparatus for generating the optical local oscillator signals comprising:
      (i) multi-wavelength photonic oscillator; and
      (ii) a wavelength division demultiplexer coupled to an optical output of the multi-wavelength photonic oscillator, said wavelength division demultiplexer separating the optical output of the multi-wavelength photonic oscillator into more than one wavelength region, with the optical output at each wavelength region comprising at least an optical carrier and a modulation sideband, the output at each wavelength region being suitable for determining a local oscillator frequency; and
      (iii) a plurality of slave lasers arranged as pairs of slave lasers, each pair of slave lasers being wavelength-associated with a particular wavelength region of said multi-wavelength photonic oscillator and being coupled to said multi-wavelength photonic oscillator via said wavelength division demultiplexer, and wherein one slave laser in each said pair of slave lasers is set so that its free-running wavelength matches a modulation sideband in an optical signal supplied by the multi-wavelength photonic oscillator.

33. The receiver of claim 32 wherein the other slave laser in each said pair of slave lasers is set so that its free-running wavelength matches a different modulation sideband in the optical signal supplied by the multi-wavelength photonic oscillator.

34. The receiver of claim 32 wherein the other slave laser in each said pair of slave lasers is set so that its free-running wavelength matches a carrier frequency in an optical signal supplied by the multi-wavelength photonic oscillator.

35. The receiver of claim 30 wherein the multi-wavelength photonic oscillator comprises:
   (1) a plurality of lasers each emitting light at a different frequency;
   (2) an optical wavelength multiplexer for combining the light emitted by the plurality of lasers at an output thereof as a set of optical wavelengths; and
   (3) an optical modulator arranged in a feedback loop and coupled to receive light at the output of the optical wavelength multiplexer, the feedback loop further including:
      an optical tap for coupling at least a subset of said set of optical wavelengths to at least one optical output of the multi-wavelength photonic modulator;
      at least one optical channel having an associated photodetector arranged to receive light from the optical tap via the at least one optical channel; and
      an electronic loop portion coupled to receive output from the at least one associated photodetector and to provide an input for the optical modulator.

36. The multi-wavelength photonic oscillator of claim 1 wherein said electronic loop portion provides an electrical input for the optical modulator.

37. The receiver of claim 30 wherein the modulation sidebands are frequency fixed relative to their carriers.

38. The transmitter of claim 24 wherein the modulation sidebands are frequency fixed relative to their carriers.

* * * * *